United States Patent
Nakai et al.

(10) Patent No.: US 8,980,497 B2
(45) Date of Patent: Mar. 17, 2015

(54) SECONDARY BATTERY INCLUDING ANODE WITH A COATING CONTAINING A $SO_3$ CONTAINING COMPOUND

(75) Inventors: Hideki Nakai, Fukushima (JP); Atsumichi Kawashima, Fukushima (JP); Akinori Kita, Fukushima (JP)

(73) Assignee: Sony Corporation, Tokyo (JP)

( * ) Notice: Subject to any disclaimer, the term of this patent is extended or adjusted under 35 U.S.C. 154(b) by 1747 days.

(21) Appl. No.: 11/561,612

(22) Filed: Nov. 20, 2006

(65) Prior Publication Data

US 2007/0117024 A1    May 24, 2007

(30) Foreign Application Priority Data

Nov. 21, 2005   (JP) .............................. JP2005-336107

(51) Int. Cl.
    H01M 4/36       (2006.01)
    *H01M 10/052*   (2010.01)
    *H01M 4/133*    (2010.01)
    *H01M 4/136*    (2010.01)
    *H01M 4/58*     (2010.01)
    H01M 4/485      (2010.01)
    H01M 6/16       (2006.01)
    H01M 10/0568    (2010.01)

(52) U.S. Cl.
    CPC ............ *H01M 10/052* (2013.01); *H01M 4/133* (2013.01); *H01M 4/136* (2013.01); *H01M 4/485* (2013.01); *H01M 4/581* (2013.01); *H01M 4/5815* (2013.01); *H01M 6/16* (2013.01); *H01M 6/166* (2013.01); *H01M 10/0568* (2013.01); *Y02E 60/122* (2013.01)

USPC .......................................................... 429/446

(58) Field of Classification Search
    None
    See application file for complete search history.

(56) References Cited

U.S. PATENT DOCUMENTS

2003/0113636 A1*  6/2003  Sano et al. ..................... 429/330
2005/0221187 A1* 10/2005  Inagaki et al. ............ 429/231.95

FOREIGN PATENT DOCUMENTS

| | | |
|---|---|---|
| JP | 2000-123880 | 4/2000 |
| JP | 2000-323124 | 11/2000 |
| JP | 2001-043895 | 2/2001 |
| JP | 2001-283910 | 10/2001 |
| JP | 2003-077533 | 3/2003 |
| JP | 2004-087437 | 3/2004 |
| JP | 2004-281218 | 10/2004 |
| JP | 2005-209433 | 8/2005 |
| WO | 2004-023590 | 3/2004 |
| WO | 2005-029613 | 3/2005 |

OTHER PUBLICATIONS

Japanese Office Action for corresponding JP2005-336107 issued on Mar. 16, 2010.

* cited by examiner

*Primary Examiner* — Patrick Ryan
*Assistant Examiner* — Wyatt McConnell
(74) *Attorney, Agent, or Firm* — K&L Gates LLP

(57) ABSTRACT

A battery capable of reducing swelling is provided. A battery includes a cathode, an anode and an electrolyte. The anode includes a coating containing a $SO_3$-containing compound, and the electrolyte contains an electrolyte salt having reduction power. Therefore, on the surface of the anode, the $SO_3$-containing compound is preferentially reduced and decomposed to become a sulfur-containing compound. In the result, decomposition reaction of the electrolyte is prevented.

12 Claims, 3 Drawing Sheets

SECONDARY BATTERY INCLUDING ANODE WITH A COATING CONTAINING A $SO_3$ CONTAINING COMPOUND

CROSS REFERENCES TO RELATED APPLICATIONS

The present application claims priority to Japanese Patent Application JP 2005-336107 filed in the Japanese Patent Office on Nov. 21, 2005, the entire contents of which being incorporated herein by reference.

BACKGROUND

The present disclosure relates to a battery including an anode having a coating.

In recent years, portable electronic devices such as notebook-sized personal computers, combination cameras, and mobile phones have been introduced one after another, and their size and weight have been reduced. Accordingly, secondary batteries have been highlighted as a portable power source, and researches to obtain a higher energy density have been actively conducted. In such circumstances, as a secondary battery having a high energy density, lithium ion secondary batteries have been proposed and in practical use.

In the past, in the lithium ion secondary batteries, an electrolytic solution which is a liquid electrolyte in which a lithium salt is dissolved in a nonaqueous solvent has been used as a substance working for ion conduction. Therefore, to prevent leakage, it has been necessary to use a metal container as a package member and strictly secure the airtightness of the inside of the battery. However, when the metal container is used as a package member, it has been extremely difficult to form a thin sheet type battery with the large area, a thin card type battery with a small area, a flexible battery in the shape having a higher degree of freedom or the like.

Therefore, instead of the electrolytic solution, secondary batteries using a gelatinous electrolyte in which an electrolytic solution is held by a polymer have been proposed (for example, refer to Japanese Unexamined Patent Application Publication No. 2001-283910). Such a battery is free from the leakage. Therefore, a laminated film or the like can be used as a package member. Thus, its size, weight, and thickness can be more reduced. In addition, the degree of freedom of the shape can be increased.

However, when the laminated film is used as a package member, there is a disadvantage as follows. That is, when the battery is stored in a high temperature environment, the battery is easily swollen due to gas caused by decomposition of the electrolytic solution. Therefore, it is desirable to provide a battery capable of preventing swelling.

SUMMARY

According to an embodiment, there is provided a battery including a cathode, an anode, and an electrolyte, wherein the anode includes a coating containing a $SO_3$-containing compound, and the electrolyte contains an electrolyte salt having reduction power.

According to the battery of the embodiment, the anode includes the coating containing the $SO_3$-containing compound. Therefore, the $SO_3$-containing compound is preferentially reduced and decomposed to become a sulfur-containing compound. Thereby, decomposition reaction of the electrolyte is prevented. Consequently, swollenness of the battery can be prevented even in the high temperature environment.

Other and further objects, features and advantages of the invention will appear more fully from the following description.

Additional features and advantages are described herein, and will be apparent from, the following Detailed Description and the figures.

DETAILED DESCRIPTION

Embodiments will be hereinafter described in detail with reference to the drawings.

Figure 1:
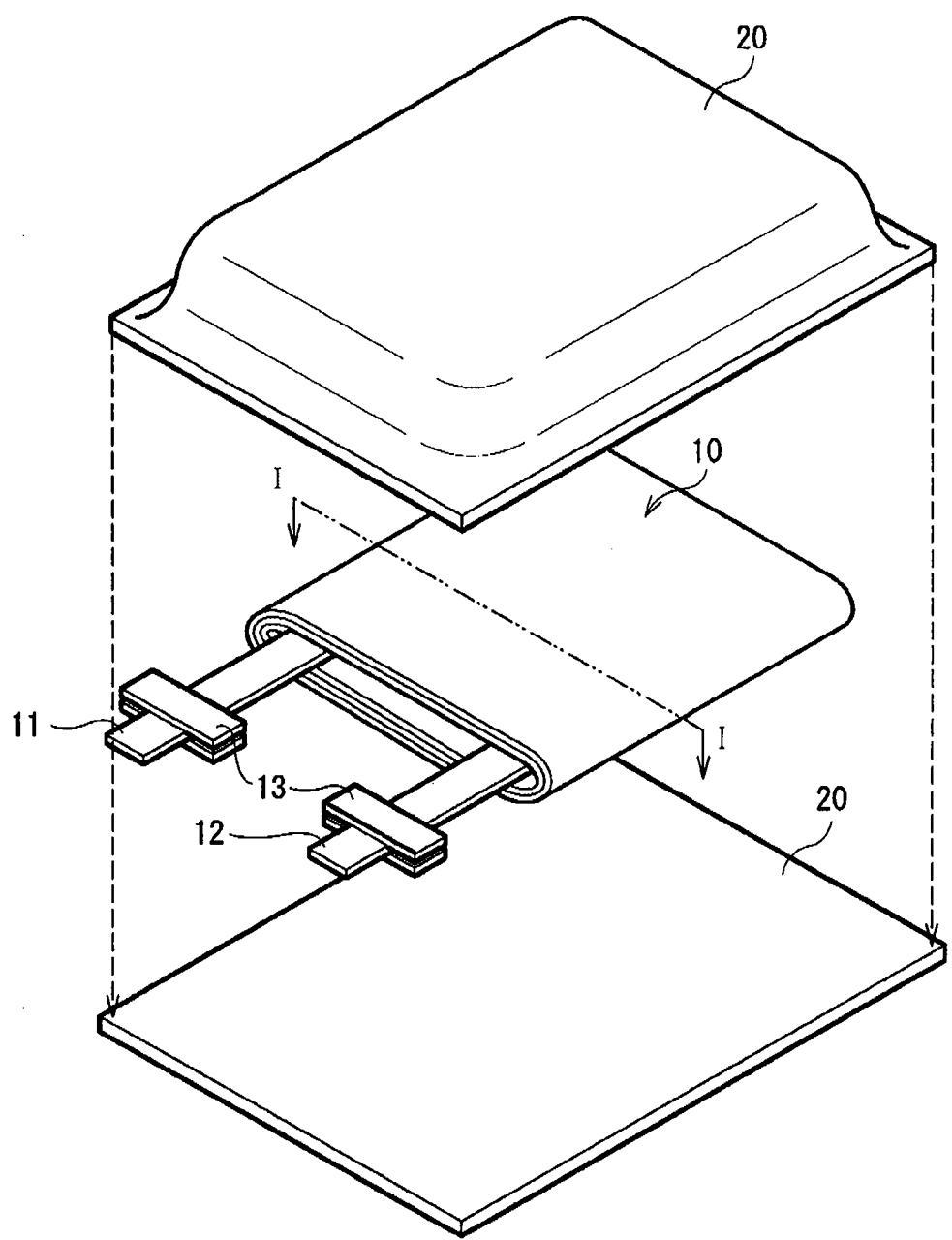
FIG. 1 is a partial exploded perspective view showing a structure of a battery according to an embodiment.

FIG. 1 shows an exploded view of a secondary battery according to an embodiment. The secondary battery includes a spirally wound electrode body 10 on which a cathode lead 11 and an anode lead 12 are attached inside a film-shaped package member 20. The cathode lead 11 and the anode lead 12 are directed from the inside to the outside of the package member 20 and respectively derived in the same direction, for example. The cathode lead 11 and the anode lead 12 are respectively made of, for example, a metal material such as aluminum (Al), copper (Cu), nickel (Ni), and stainless, and are in the shape of a thin plate or mesh.

The package member 20 is made of a rectangular laminated film in which, for example, a nylon film, an aluminum foil, and a polyethylene film are bonded together in this order. The package member 20 is, for example, arranged so that the polyethylene film side and the spirally wound electrode body 10 are opposed, and the respective outer edges are contacted to each other by fusion bonding or an adhesive. Adhesive films 13 to protect from entering of outside air are inserted between the package member 20 and the cathode lead 11, the anode lead 12. The adhesive film 13 is made of a material having contact characteristics to the cathode lead 11 and the anode lead 12. For example, when the cathode lead 11 and the anode lead 12 are made of the foregoing metal material, the adhesive film 13 is preferably made of a polyolefin resin such as polyethylene, polypropylene, modified polyethylene, and modified polypropylene.

The package member 20 may be made of a laminated film having other structure, a polymer film such as polypropylene, or a metal film, instead of the foregoing laminated film.

Figure 2:
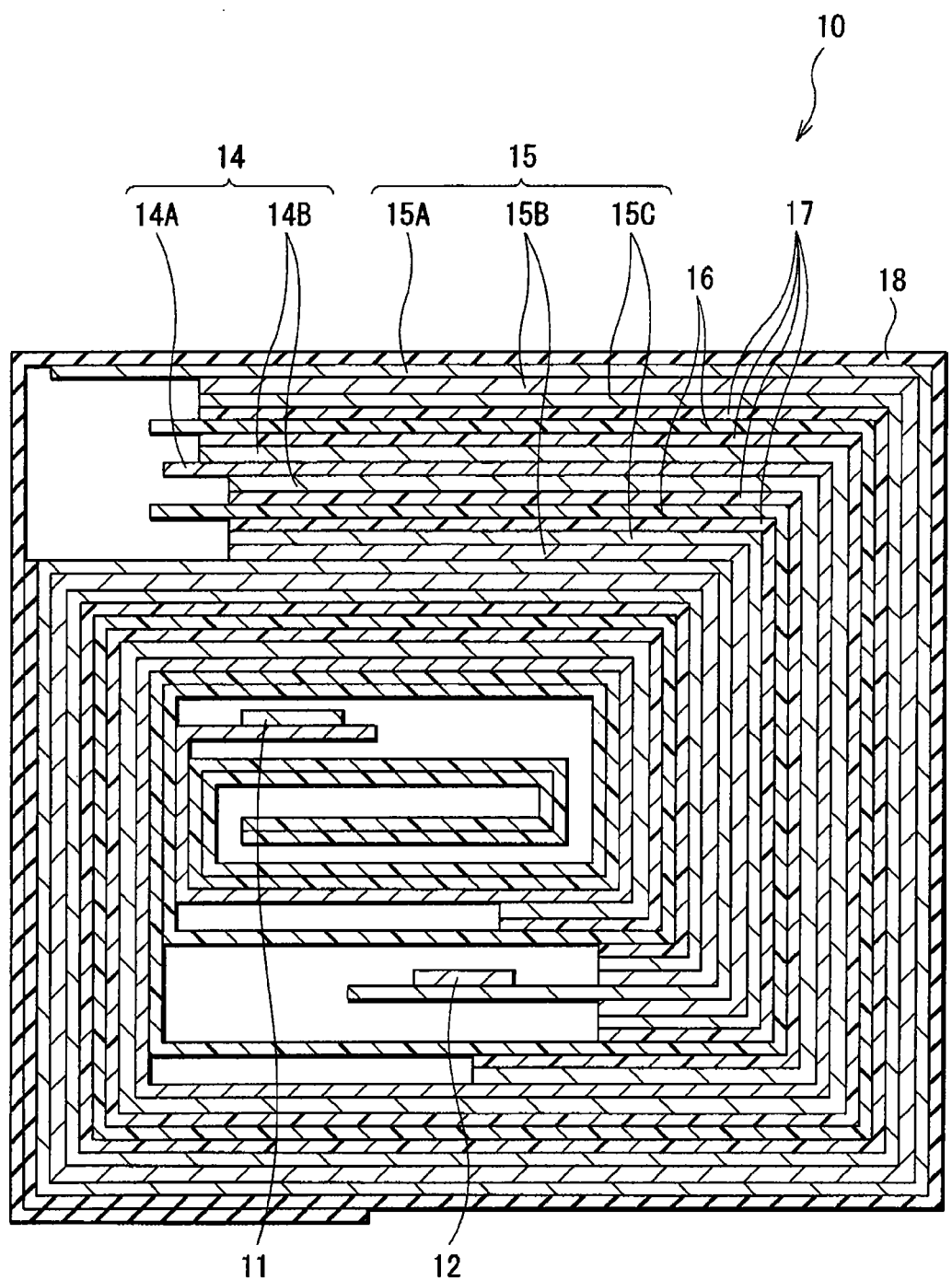
FIG. 2 is a cross section showing a structure taken along line I-I of a spirally wound electrode body shown in FIG. 1.

FIG. 2 shows a cross sectional structure taken along line I-I of the spirally wound electrode body 10 shown in FIG. 1. In the spirally wound electrode body 10, a cathode 14 and an anode 15 are layered and spirally wound with a separator 16 and an electrolyte 17 in between. The outermost periphery of the spirally wound electrode body 10 is protected by a protective tape 18.

The cathode 14 has, for example, a cathode current collector 14A having a pair of opposed faces and a cathode active material layer 14B provided on the both faces or one face of the cathode current collector 14A. For example, the cathode current collector 14A is made of a metal foil such as an aluminum foil, a nickel foil, and a stainless foil, and one end thereof is attached with the cathode lead 11. The cathode active material layer 14B contains, for example, as a cathode active material, one or more cathode materials capable of inserting and extracting lithium (Li). If necessary, the cathode active material layer 14B may contain an electrical conductor and a binder.

As a cathode material capable of inserting and extracting lithium, for example, a lithium complex oxide containing lithium and a transition metal or a lithium phosphate compound containing lithium and a transition metal is preferable, since such a compound can generate a high voltage and provide a high capacity. A lithium complex oxide or a lithium phosphate compound which contains at least one selected from the group consisting of cobalt (Co), nickel, manganese (Mn), iron (Fe), aluminum, vanadium (V), titanium (Ti), chromium (Cr), and copper as a transition metal is preferable. In particular, a lithium complex oxide or a lithium phosphate compound which contains at least one selected from the group consisting of cobalt, nickel, and manganese is more preferable. The chemical formula thereof is expressed by, for example, $Li_xMIO_2$ or $Li_yMIIPO_4$. In the formula, MI and MII represent one or more transition metal elements. The values of x and y vary according to the charge and discharge state of the battery, and are generally in the range of $0.05 \leq x \leq 1.10$ and $0.05 \leq y \leq 1.10$.

As a specific example of the lithium complex oxide, a lithium cobalt complex oxide ($Li_xCoO_2$), a lithium nickel complex oxide ($Li_xNiO_2$), a lithium nickel cobalt complex oxide ($Li_xNi_{1-v}Co_vO_2$ (v<1)), a lithium manganese complex oxide having a spinel structure ($Li_xMn_2O_4$) or the like can be cited. As a specific example of the lithium phosphate compound, for example, lithium iron phosphate compound ($LiFePO_4$) or a lithium iron manganese phosphate compound ($LiFe_{1-z}Mn_zPO_4$ (z<1)) can be cited.

As an electrical conductor, for example, a carbon material such as graphite, carbon black, and Ketjen black can be cited. Further, in addition to the carbon material, a metal material, a conductive polymer material or the like may be used, as long as the material has conductivity. As a binder, for example, synthetic rubber such as styrene butadiene rubber, fluorinated rubber, and ethylene propylene diene rubber, or a polymer material such as polyvinylidene fluoride can be cited.

The anode 15 has, for example, an anode current collector 15A having a pair of opposed faces and an anode active material layer 15B provided on the both faces or one face of the anode current collector 15A. For example, the anode current collector 15A is made of a metal foil such as a copper foil, a nickel foil, and a stainless foil, and one end thereof is attached with the anode lead 12. The anode active material layer 15B contains, for example, as an anode active material, one or more anode materials capable of inserting and extracting lithium. If necessary, the anode active material layer 15B may contain an electrical conductor and a binder.

As an anode material capable of inserting and extracting lithium, for example, a carbon material can be cited. As a carbon material, for example, graphite, non-graphitizable carbon, graphitizable carbon or the like can be cited. These carbon materials are preferable, since a change in the crystal structure generated in charge and discharge is very small, a high charge and discharge capacity can be obtained, and favorable cycle characteristics can be obtained. In particular, graphite is preferable, since the electrochemical equivalent is large, and a high energy density can be obtained.

As graphite, natural graphite and artificial graphite may be used. For example, the true density of graphite is preferably 2.10 g/cm³ or more, and more preferably 2.18 g/cm³ or more. To obtain such a true density, the thickness of the C-axis crystallite of the (002) plane should be 14.0 nm or more. The spacing of the (002) plane is preferably under 0.340 nm, and more preferably in the range from 0.335 nm to 0.337 nm.

As an anode material capable of inserting and extracting lithium, a material which contains a metal element or a metalloid element capable of forming an alloy with lithium as an element can be also cited. Specifically, a simple substance, an alloy, or a compound of a metal element capable of forming an alloy with lithium, or a simple substance, an alloy, or a compound of a metalloid element capable of forming an alloy with lithium, or a material having one or more phases thereof at least in part can be cited. Specially, a material containing silicon or tin as an element is preferable, since such a material has a high ability to insert and extract lithium, and provides a high energy density.

As an anode material capable of inserting and extracting lithium, a metal oxide such as iron oxide, ruthenium oxide, and molybdenum oxide or a polymer such as polyacetylene and polypyrrole can be cited.

The anode 15 further includes a coating 15C on the surface of the anode active material layer 15B. The coating 15C contains a $SO_3$-containing compound such as an organic compound or an oligomer having $SO_3$. The coating 15C may contain one or more compounds having $SO_3$, or may further contain other compound. Thereby, in the secondary battery, the $SO_3$-containing compound is preferentially reduced and decomposed to become a sulfur-containing compound, and thus decomposition reaction of the electrolyte 17 can be prevented. For example, by X-ray photoelectron spectroscopy (XPS), the sulfur (S) 2p spectrum (S2p spectrum) of the $SO_3$-containing compound is measured in the region from 166 eV to 169 eV. For example, by XPS, the S2p spectrum of the sulfur-containing compound produced by reduction is measured in the region from 162 eV to 165 eV. Further, the chemical formula of the $SO_3$-containing compound is expressed by, for example, $C_xH_y(SO_3)_z$ (x, y, and z are an integer number of 1 or more, respectively). The chemical formula of the sulfur-containing compound produced by reduction is expressed by, for example, $C_XH_YS_Z$ (X, Y, and Z are an integer number of 1 or more, respectively). The thickness of the coating 15C is preferably, for example, 100 nm or less. When the thickness is excessively large, the electrode resistance becomes large.

The separator 16 is formed of a porous film made of a synthetic resin such as polytetrafluoroethylene, polypropylene, and polyethylene, or a ceramic porous film. The separator 16 may have a structure in which two or more porous films of the foregoing porous films are layered. Specially, the polyolefin porous film is preferable, since such a film has superior short circuit prevention effect and can improve battery safety by shutdown effect. In particular, polyethylene is preferably used as a material of the separator 16, since polyethylene can provide shutdown effect in the range from 100° C. to 160° C., and has superior electrochemical stability. Further, polypropylene is also preferable. Other resin having chemical stability may be used by being copolymerized with polyethylene or polypropylene, or being blended therewith.

The electrolyte 17 is made of a so-called gelatinous electrolyte in which an electrolytic solution is held by a polymer. As a polymer, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, or polycarbonate can be cited. In particular, in terms of electrochemical stability, a polymer having a structure of polyacrylonitrile, polyvinylidene fluoride, polyhexafluoropropylene, or polyethylene oxide is desirably used.

The electrolytic solution contains, for example, a solvent and an electrolyte salt, and may contain various additives if necessary, As a solvent, for example, a nonaqueous solvent such as propylene carbonate, ethylene carbonate, diethyl carbonate, dimethyl carbonate, 1,2-dimethoxyethane, 1,2-diethoxyethane, γ-butyrolactone, tetrahydrofuran, 1,3-dioxolane, 4-methyl-1,3-dioxolane, diethyl ether, sulfolane, methyl sulfolane, acetonitrile, propionitrile, vinylene carbonate, halogenated chain ester carbonate, and halogenated cyclic ester carbonate can be cited. One of the solvents may be used singly, or two or more thereof may be used by mixing.

For the electrolyte salt, at least one of the electrolyte salts having reduction power is used. Thereby, the $SO_3$-containing compound contained in the coating 15C is reduced and decomposed. As the electrolyte salt having reduction power, for example, lithium hexafluorophosphate ($LiPF_6$), lithium borate tetrafluoride ($LiBF_4$), lithium arsenate hexafluoride ($LiAsF_6$), tetraphenyl lithium borate ($LiB(C_6H_5)_4$), lithium chloride (LiCl), lithium bromide (LiBr), methane sulfonic acid lithium ($LiCH_3SO_3$), or trifluoro methane sulfonic acid lithium ($LiCF_3SO_3$) can be cited. Specially, lithium hexafluorophosphate is preferably used, since thereby high ion conductivity can be obtained. Two or more of the electrolyte salts may be used by mixing. Otherwise, an electrolyte salt not having reduction power may be mixed with the electrolyte salt having reduction power.

Further, the electrolytic solution may contain a $SO_3$-containing compound, or a precursor which produces the $SO_3$-containing compound by reaction.

The secondary battery can be manufactured, for example, as follows.

First, for example, the cathode active material layer 14B is formed on the cathode current collector 14A to form the cathode 14. Further, for example, the anode active material layer 15B is formed on the anode current collector 15A, and then the coating 15C is formed on the anode active material layer 15B to form the anode 15.

The coating 15C may be directly formed by, for example, spin coating method, vapor-phase deposition method or the like. Otherwise, the coating 15C may be formed by forming a film containing a precursor for producing the $SO_3$-containing compound by, for example, spin coating method, vapor-phase deposition method or the like, and then reacting the precursor by heat treatment or the like. Otherwise, the coating 15C may be formed electrochemically. For example, the coating 15C may be formed by dissolving the $SO_3$-containing compound in an electrolytic solution in which an electrolyte salt is dissolved in a solvent and applying a current thereto. Otherwise, the coating 15C may be formed by dissolving a precursor for producing the $SO_3$-containing compound in an electrolytic solution and applying a current thereto to react the precursor.

Next, the electrolyte 17 containing the electrolytic solution and the polymer is formed on the cathode 14 and the anode 15, respectively. After that, the cathode lead 11 and the anode lead 12 are attached to the cathode 14 and the anode 15 and are layered and spirally wound with the separator 16 in between to form the spirally wound electrode body 10. Subsequently, the spirally wound electrode body 10 is sandwiched between the package member 20, the outer edges of the package member 20 are contacted by thermal fusion bonding or the like, and the spirally wound electrode body 10 is enclosed. The secondary battery shown in FIGS. 1 and 2 is thereby completed.

Instead of assembling the battery after forming the coating 15C, it is possible that the $SO_3$-containing compound or the precursor for producing the $SO_3$-containing compound by reaction is added to the electrolytic solution, the battery is assembled, and then the coating 15C is formed by charging.

Further, instead of spirally winding the lamination after forming the electrolyte 17 on the cathode 14 and the anode 15, it is possible that the cathode 14 and the anode 15 are spirally wound with the separator 16 in between, the spirally wound body is sandwiched between the package member 20, and then an electrolyte composition of matter containing an electrolytic solution and a monomer of a polymer is injected therein, the monomer is polymerized inside the package member 20 to form the electrolyte 17.

In the secondary battery, when charged, for example, lithium ions are extracted from the cathode 14 and inserted in the anode 15 through the electrolyte 17. Meanwhile, when discharged, for example, the lithium ions are extracted from the anode 15, and inserted in the cathode 14 through the electrolyte 17. Then, since the coating 15C containing the $SO_3$-containing compound is formed on the surface of the anode 15, the $SO_3$-containing compound is preferentially reduced and decomposed to become the sulfur-containing compound. Thereby, decomposition reaction of the electrolyte 17 is prevented.

As above, according to this embodiment, the coating 15C containing the $SO_3$-containing compound is included in the anode 15. Therefore, decomposition reaction of the electrolyte 17 can be prevented. In the result, the battery is prevented from being swollen even in the high temperature environment.

EXAMPLES

Further, specific examples are hereinafter described in detail.

Examples 1-1 and 1-2

The secondary batteries shown in FIGS. 1 and 2 are fabricated as follows. First, 91 parts by weight of lithium cobalt complex oxide ($LiCoO_2$) powder as a cathode active material, 6 parts by weight of graphite as an electrical conductor, and 3 parts by weight of polyvinylidene fluoride as a binder were mixed. The resultant mixture was dispersed in a disperse medium to obtain cathode mixture slurry. Subsequently, the cathode current collector 14A made of an aluminum foil was coated with the cathode mixture slurry, which was dried and compression-molded to form the cathode active material layer 14B and thereby forming the cathode 14.

Further, 90 parts by weight of artificial graphite powder as an anode active material and 10 parts by weight of polyvinylidene fluoride as a binder were mixed. The resultant mixture was dispersed in a disperse medium to obtain an anode mixture slurry. Next, the anode current collector 15A made of a copper foil was coated with the anode mixture slurry, which was dried and compression-molded to form the anode active material layer 15B. Next, the coating 15C was formed by applying the anode active material layer 15B with the $SO_3$-containing compound by spin coating method and vacuum drying. Thereby, the anode 15 was formed. As the $SO_3$-containing compound, 2-butene-1,4-disulfonic dimethyl ester was used in Example 1-1, and di-n-butyl sulfite was used in Example 1-2.

Subsequently, the electrolyte 17 containing an electrolytic solution and a polymer was formed respectively on the formed cathode 14 and the formed anode 15. For the electrolytic solution, a solution obtained by dissolving lithium hexafluorophosphate as an electrolyte salt at a concentration of 0.9 mol/kg in a mixed solvent of ethylene carbonate, propylene carbonate, ethyl methyl carbonate, diethyl carbonate, and vinylene carbonate at a volume ratio of 20:20:30:30:1 in this order was used. For the polymer, a copolymer of vinylidene fluoride and hexafluoropropylene was used. Next, the cathode lead 11 and the anode lead 12 were attached to the cathode 14 and the anode 15. Subsequently, the cathode 14 and the anode 15 were layered and spirally wound with the separator 16 in between to form the spirally wound electrode body 10. After that, the spirally wound electrode body 10 was contained inside the package member 20 made of a laminated film.

With regard to Comparative example 1-1 relative to Examples 1-1 and 1-2, a secondary battery was fabricated in the same manner as in Examples 1-1 and 1-2, except that a coating was not formed on the anode. With regard to Comparative example 1-2, a secondary battery was fabricated in the same manner as in Examples 1-1 and 1-2, except that a coating was not formed on the anode and lithium perchlorate ($LiClO_4$) not having reduction power was used as an electrolyte salt. With regard to Comparative examples 1-3 and 1-4, secondary batteries were fabricated in the same manner as in Examples 1-1 and 1-2, except that lithium perchlorate was used as an electrolyte salt. The coating was formed from 2-butene-1,4-disulfonic dimethyl ester in Comparative example 1-3, and was formed from di-n-butyl sulfite in Comparative example 1-4.

For the fabricated secondary batteries of Examples 1-1, 1-2, and Comparative examples 1-1 to 1-4, the initial capacity, the swelling amount when stored at high temperature, and the capacity retention ratio after storage at high temperature were respectively examined. The initial capacity means the discharge capacity at the first cycle when charge and discharge were performed at 23° C. Charge was performed as follows. After constant current charge was performed at a constant current of 1 C until the battery voltage reached 4.2 V, constant voltage charge was performed at a constant voltage of 4.2 V until the current reached 1 mA. For discharge, constant current discharge was performed at a constant current of 1 C until the battery voltage reached 3.0 V. 1 C means the current value at which the theoretical capacity is discharged in 1 hour.

The swelling amount when stored at high temperature was obtained as follows. Charge and discharge were performed 1 cycle under the foregoing conditions and the battery thickness before storage was measured. After that, the battery was charged again, and stored at 60° C. for 1 month. The battery thickness after storage was measured, and the battery thickness before storage was subtracted from the battery thickness after storage. The capacity retention ratio after storage at high temperature was obtained as follows. Charge and discharge were performed 1 cycle under the foregoing conditions. After that, the battery was charged again, and stored at 60° C. for 1 month. Then, discharge was performed under the foregoing conditions again, and the capacity after storage was measured. The ratio (%) of the capacity after storage to the initial capacity was obtained. The obtained results are shown in Table 1.

TABLE 1

|  | Electrolyte salt | $SO_3$ coating | Initial capacity (mAh) | Swelling amount (mm) | Capacity retention ratio after storage (%) |
|---|---|---|---|---|---|
| Example 1-1 | $LiPF_6$ | Applicable | 812 | 0.3 | 91.9 |
| Example 1-2 | $LiPF_6$ | Applicable | 811 | 0.4 | 91.8 |
| Comparative example 1-1 | $LiPF_6$ | N/A | 810 | 1.1 | 91.1 |
| Comparative example 1-2 | $LiClO_4$ | N/A | 812 | 4.5 | 91.8 |
| Comparative example 1-3 | $LiClO_4$ | Applicable | 811 | 4.2 | 91.6 |
| Comparative example 1-4 | $LiClO_4$ | Applicable | 813 | 4.3 | 91.9 |

Further, for the fabricated secondary batteries of Examples 1-1 and 1-2, after charge and discharge were performed 1 cycle under the foregoing conditions, the secondary batteries were disassembled to take out the anode 15 which was washed with dimethyl carbonate, vacuum-dried, and analyzed by XPS. Further, for the fabricated secondary batteries of Examples 1-1 and 1-2, after charge and discharge were performed 1 cycle under the foregoing conditions, the secondary batteries were stored at 90° C. for 4 hours, disassembled to take out the anode 15 which was washed with dimethyl carbonate, vacuum-dried, and analyzed by XPS. In the XPS analysis, the F1s peak was used for energy correction of the spectrum. Specifically, the F1s spectrum of the sample was measured, waveform analysis was performed, and the position of the main peak existing on the lowest bound energy side was 687.6 eV. For the waveform analysis, a commercially available software was used.

In the result, in both Example 1-1 and 1-2, the S2p spectrum was measured in the region from 166 eV to 169 eV for the anode 15 after 1 cycle, and the S2p spectrum was measured in the region from 162 eV to 165 eV for the anode 15 after storage at 90° C. That is, it was confirmed that in Example 1-1 and 1-2, the coating 15C containing the $SO_3$-containing compound was formed, and the $SO_3$-containing compound was reduced by the storage at high temperature to become a sulfur-containing compound.

Further, as shown in Table 1, according to Examples 1-1 and 1-2 forming the coating 15C, the swelling amount could be decreased compared to Comparative examples 1-1 and 1-2 not forming the coating and Comparative examples 1-3 and 1-4 using the electrolyte salt not having reduction power, and the initial capacity and the capacity retention ratio after storage were equal to or more than those of Comparative examples 1-1 to 1-4. That is, it was found that when the coating 15C containing the $SO_3$-containing compound was formed on the anode 15, a high capacity could be obtained and swelling can be suppressed.

Examples 2-1 to 2-6

Secondary batteries with a structure of the coating 15C different from those of Examples 1-1 and 1-2 were fabricated.

First, the anode active material layer 15B was formed on the anode current collector 15A in the same manner as in Examples 1-1 and 1-2. Further, the cathode 14 was formed in the same manner as in Examples 1-1 and 1-2, and the electrolyte 17 was formed on the cathode 14 and the anode active material layer 15B. After that, the cathode 14 and the anode 15 were spirally wound with the separator 16 in between to form the spirally wound electrode body, which was contained inside the package member 20. Then, as a precursor for generating the $SO_3$-containing compound, 1,3-propane sultone (3-hydroxy propane sulfonic γ-sultone) was prepared in Example 2-1, and propene sultone (3-hydroxy propene sulfonic γ-sultone) was prepared in Examples 2-2 to 2-6. 0.5 wt % of each prepared precursor was added to the electrolytic solution.

As Comparative examples 2-1 and 2-2 relative to Examples 2-1 to 2-6, secondary batteries were fabricated in the same manner as in Examples 2-1 and 2-2, except that lithium perchlorate was used as an electrolyte salt. 1,3-propane sultone was added to the electrolytic solution in Comparative example 2-1, and propene sultone was added to the electrolytic solution in Comparative example 2-1.

For the fabricated secondary batteries of Examples 2-1 to 2-6 and Comparative examples 2-1 and 2-2, the initial capacity, the swelling amount when stored at high temperature, and the capacity retention ratio after storage at high temperature were respectively examined. The current when charged and discharged was 1 C in Examples 2-1, 2-2 and Comparative examples 2-1, 2-2; 0.1 C in Example 2-3; 0.5 C in Example 2-4; 2 C in Example 2-5; and 3 C in Example 2-6. 0.1 C means the current value at which the theoretical capacity is discharged in 10 hours. 0.5 C means the current value at which the theoretical capacity is discharged in 2 hours. 2 C means the current value at which the theoretical capacity is discharged in 0.5 hour. 3 C means the current value at which the theoretical capacity is discharged in ⅓ hour. The obtained results are shown in Table 2 together with the results of Comparative examples 1-1 and 1-2.

Figure 3:
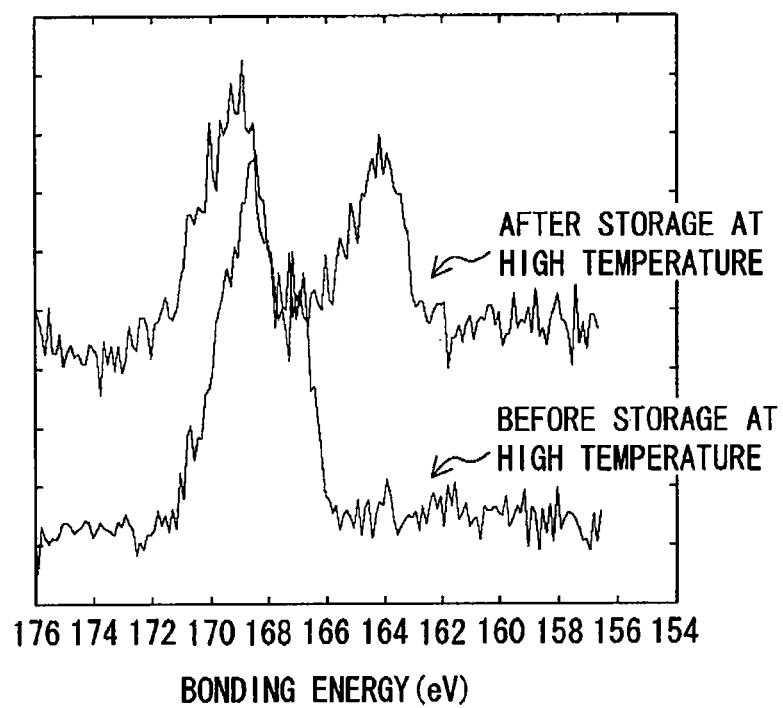
FIG. 3 is a characteristics diagram showing a result of XPS of an anode according to Example 2-2.

Examples 1-1 and 1-2. That is, it was confirmed that the coating 15C containing the $SO_3$-containing compound was formed on the anode 15, and the $SO_3$-containing compound was reduced by the storage at high temperature to become a sulfur-containing compound. FIG. 3 shows the spectrums obtained by XPS of Example 2-2.

Further, as shown in Table 2, according to Examples 2-1 to 2-6 forming the coating 15C, the swelling amount could be decreased compared to Comparative examples 1-1 and 1-2 not forming the coating and Comparative examples 2-1 and 2-2 using the electrolyte salt not having reduction power, and the initial capacity and the capacity retention ratio after storage were equal to or more than those of Comparative examples 1-1, 1-2, 2-1, and 2-2. That is, it was found that when the coating 15C containing the $SO_3$-containing compound was formed on the anode 15, a high capacity could be obtained and swelling can be suppressed.

Further, among Examples 2-1 to 2-6, the swelling amount could be further decreased particularly in Examples 2-3 and 2-4 forming the coating 15C with the decreased current density. It is believed that the reason thereof is that the coating 15C was formed more uniformly due to the decreased current density.

The embodiments have been described with reference to the examples. However, the embodiments are not limited to the examples, and various modifications may be made. For example, in the foregoing embodiment and the foregoing examples, the descriptions have been given of the case using the gelatinous electrolyte in which the electrolytic solution is held by the polymer. However, an electrolytic solution as a liquid electrolyte may be used directly. Alternatively, an electrolyte having other structure such as an organic solid electrolyte in which an electrolyte salt is dispersed in an ion conductive organic polymer, and an electrolyte composed of a mixture of an inorganic solid electrolyte made of an ion conductive inorganic compound and an electrolytic solution may be used.

TABLE 2

|  | Electrolyte salt | $SO_3$ coating | Initial capacity (mAh) | Swelling amount (mm) | Capacity retention ratio after storage (%) |
|---|---|---|---|---|---|
| Example 2-1 | $LiPF_6$ | Applicable | 814 | 0.3 | 92.5 |
| Example 2-2 | $LiPF_6$ | Applicable | 813 | 0.2 | 92.2 |
| Example 2-3 | $LiPF_6$ | Applicable | 813 | 0.1 | 92.4 |
| Example 2-4 | $LiPF_6$ | Applicable | 812 | 0.2 | 92.2 |
| Example 2-5 | $LiPF_6$ | Applicable | 761 | 0.6 | 91.8 |
| Example 2-6 | $LiPF_6$ | Applicable | 649 | 0.9 | 91.3 |
| Comparative example 1-1 | $LiPF_6$ | N/A | 810 | 1.1 | 91.1 |
| Comparative example 1-2 | $LiClO_4$ | N/A | 812 | 4.5 | 91.8 |
| Comparative example 2-1 | $LiClO_4$ | Applicable | 812 | 4.1 | 92.1 |
| Comparative example 2-2 | $LiClO_4$ | Applicable | 813 | 3.9 | 92.0 |

Further, for the anode 15 of Examples 2-1 to 2-6, after charge and discharge were performed 1 cycle in the same manner as in Examples 1-1 and 1-2, or after charge and discharge were performed 1 cycle and stored at 90 deg C. for 4 hours, the secondary batteries were disassembled to take out the anode 15, and analyzed by XPS. In the result, in all Examples 2-1 to 2-6, the S2p spectrum was measured in the region from 166 eV to 169 eV for the anode 15 after 1 cycle, and the S2p spectrum was measured in the region from 162 eV to 165 eV for the anode 15 after storage at 90 deg C. as in Further, in the foregoing embodiment and examples, the descriptions have been given of the case including the spirally wound electrode 10. However, the embodiments can be similarly applied to the secondary battery having other structure such as a lamination structure. Further, in the foregoing embodiment and the foregoing examples, the descriptions have been given of the case using the film-shaped package member 20. However, a package member made of a can may be used. The shape thereof may be any shape such as a cylinder, a square, a coin, and a button. Furthermore, the embodiments can be similarly applied to other battery such as primary batteries in addition to the secondary batteries.

Further, in the foregoing embodiment and the foregoing examples, the descriptions have been given of the battery using lithium as an electrode reactant. However, the embodiments can be applied to the case using other alkali metal such as sodium and potassium (K), an alkali earth metal such as magnesium and calcium (Ca), or other light metal such as aluminum.

It should be understood by those skilled in the art that various modifications, combinations, sub-combinations and alternations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
   a cathode;
   an anode; and
   an electrolyte, wherein:
   the anode includes an anode active material consisting of a carbonaceous material, and a coating formed by any one of a spin coating method and a vapor-phase deposition method, the coating comprising a $SO_3$-containing compound expressed by $C^xH_y(SO_3)_z$ where x, y, and z are integers of 1 or more,
   the electrolyte contains an electrolyte salt having reduction power,
   the cathode, the anode, and the electrolyte are included in a film-shaped package member, and
   the battery is a secondary battery.

2. The battery according to claim 1, wherein a sulfur 2p spectrum of the $SO_3$-containing compound ranges from about 166 eV to about 169 eV as measured by X-ray photoelectron spectroscopy.

3. The battery according to claim 1, wherein at least part of the $SO_3$-containing compound is reduced by the electrolyte salt to become a sulfur-containing compound.

4. The battery according to claim 3, wherein the sulfur-containing compound is expressed by $C_XH_YS_Z$ where X, Y, and Z are integers of 1 or more, respectively.

5. The battery according to claim 1, wherein the electrolyte salt is lithium hexafluorophosphate.

6. The battery according to claim 1, wherein the cathode contains a lithium complex oxide.

7. An anode for a secondary battery comprising:
   an anode current collector;
   an anode active material layer consisting of a carbonaceous material and provided on at least a portion of the anode current collector; and
   a coating on a surface of the anode active material layer comprising a $SO_3$-containing compound expressed by $C_xH_y(SO_3)_z$ where x, y, and z are integers of 1 or more.

8. The anode according to claim 7, wherein a sulfur 2p spectrum of the $SO_3$-containing compound ranges from about 166 eV to about 169 eV as measured by X-ray photoelectron spectroscopy.

9. The anode according to claim 7, wherein a sulfur 2p spectrum of the sulfur-containing compound ranges from about 162 eV to about 165 eV as measured by X-ray photoelectron spectroscopy.

10. A battery comprising:
    a cathode;
    an anode comprising an anode current collector, an anode active material layer consisting of a carbonaceous material and provided on at least a portion of the anode current collector, and a coating on a surface of the anode active material layer comprising a $SO_3$-containing compound expressed by $C_xH_y(SO_3)_z$ where x, y, and z are integers of 1 or more; and
    an electrolyte.

11. The battery according to claim 10, wherein a sulfur 2p spectrum of the $SO_3$-containing compound ranges from about 166 eV to about 169 eV as measured by X-ray photoelectron spectroscopy.

12. The battery according to claim 10, wherein a sulfur 2p spectrum of the sulfur-containing compound ranges from about 162 eV to about 165 eV as measured by X-ray photoelectron spectroscopy.

* * * * *